(12) United States Patent
Huang

(10) Patent No.: US 7,046,498 B1
(45) Date of Patent: May 16, 2006

(54) C-SHAPED COMBINATION CAPACITOR ASSEMBLY

(76) Inventor: Shou-Hsiung Huang, 83-14, Da Pian Tou, Ho chuoh Village, San Chi, Taipei Hsien (TW)

( * ) Notice: Subject to any disclaimer, the term of this patent is extended or adjusted under 35 U.S.C. 154(b) by 75 days.

(21) Appl. No.: 11/011,918

(22) Filed: Dec. 15, 2004

(51) Int. Cl.
*H01G 4/005* (2006.01)

(52) U.S. Cl. .............................. 361/301.2; 361/301.3; 361/306.1; 361/308.1; 361/310; 361/328

(58) Field of Classification Search ............. 361/301.2, 361/301.3, 306.1, 308.1, 310, 303, 328
See application file for complete search history.

(56) References Cited

U.S. PATENT DOCUMENTS

| | | | |
|---|---|---|---|
| 5,517,386 A * | 5/1996 | Te Weng ................. | 361/321.6 |
| 6,498,713 B1 * | 12/2002 | Sanger et al. ............... | 361/303 |
| 6,570,210 B1 * | 5/2003 | Sowlati et al. .............. | 257/307 |
| 6,923,106 B1 * | 8/2005 | MacDougall .................... | 89/8 |
| 2003/0133251 A1 * | 7/2003 | Kitagawa et al. ........... | 361/328 |

* cited by examiner

*Primary Examiner*—Nguyen T. Ha
(74) *Attorney, Agent, or Firm*—Hershkovitz & Associates; Abe Hershkovitz

(57) ABSTRACT

A C-shaped combination capacitor assembly has a C-shaped shell, multiple capacitors, two conducting wires, two lead wires and encapsulant. The capacitors are mounted in the C-shaped shell. The conducting wires connect the capacitors in parallel. The two lead wires connect respectively to the conducting wires and protrude from the C-shaped shell. The encapsulant fills the C-shaped shell and covers and seals the capacitors, the conducting wires and the lead wires inside the C-shaped shell.

1 Claim, 5 Drawing Sheets

C-SHAPED COMBINATION CAPACITOR ASSEMBLY

BACKGROUND OF THE INVENTION

1. Field of the Invention

The present invention relates to a C-shaped capacitor assembly, especially to a C-shaped combination capacitor assembly for a submersible motor.

2. Description of the Prior Arts

A water pump needs a motor to provide power. When the motor is working, the motor usually makes a loud noise. Therefore submersible motors are used widely with water pumps to reduce the loud noise. With reference to FIG. 5, a conventional submersible motor (60) comprises an outer shell (62), an additional shell (61) and a capacitor (70). The additional shell (61) is mounted on and communicates with one end of the outer shell (62). The capacitor (70) is mounted in the additional shell (61). The additional shell (61) with the capacitor (70) increases the volume of the conventional submersible motor (60). Furthermore, water easily enters the joint between the outer shell (62) and the additional shell (61), which causes the conventional submersible motor (60) to fail.

With further reference to FIG. 6, a submersible motor (90) with a C-shaped capacitor (80) was developed to overcome the problems with the conventional submersible motor (60). The submersible motor (90) has an outer shell (92) and an inner shell (91). The inner shell (91) is mounted in the outer shell (92). The C-shaped capacitor (80) is mounted around the inner shell (91) inside the outer shell (92). Therefore the C-shaped capacitor (80) does not increase the volume of the submersible motor (90) and does not necessitate a joint through which water can enter. The submersible motor (90) needs a large capacitance, and the volume of the C-shaped capacitor (80) is a limiting factor for the capacitance of the C-shaped capacitor (80). However, the conventional way to make large C-shaped capacitors (80) is complicated and expensive.

To overcome the shortcomings, the present invention provides a C-shaped combination capacitor assembly to mitigate or obviate the aforementioned problems.

SUMMARY OF THE INVENTION

The main objective of the present invention is to provide a C-shaped combination capacitor assembly that is made easier and is less expensive than the conventional C-shaped capacitor.

A C-shaped combination capacitor assembly in accordance with the present invention has a C-shaped shell, multiple capacitors, two conducting wires, two lead wires and encapsulant. The capacitors are mounted in the C-shaped shell. The conducting wires connect the capacitors in parallel. Two lead wires respectively connect to the conducting wires and protrude from the C-shaped shell. Encapsulant fills the C-shaped shell and covers the capacitors and the conducting wires.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
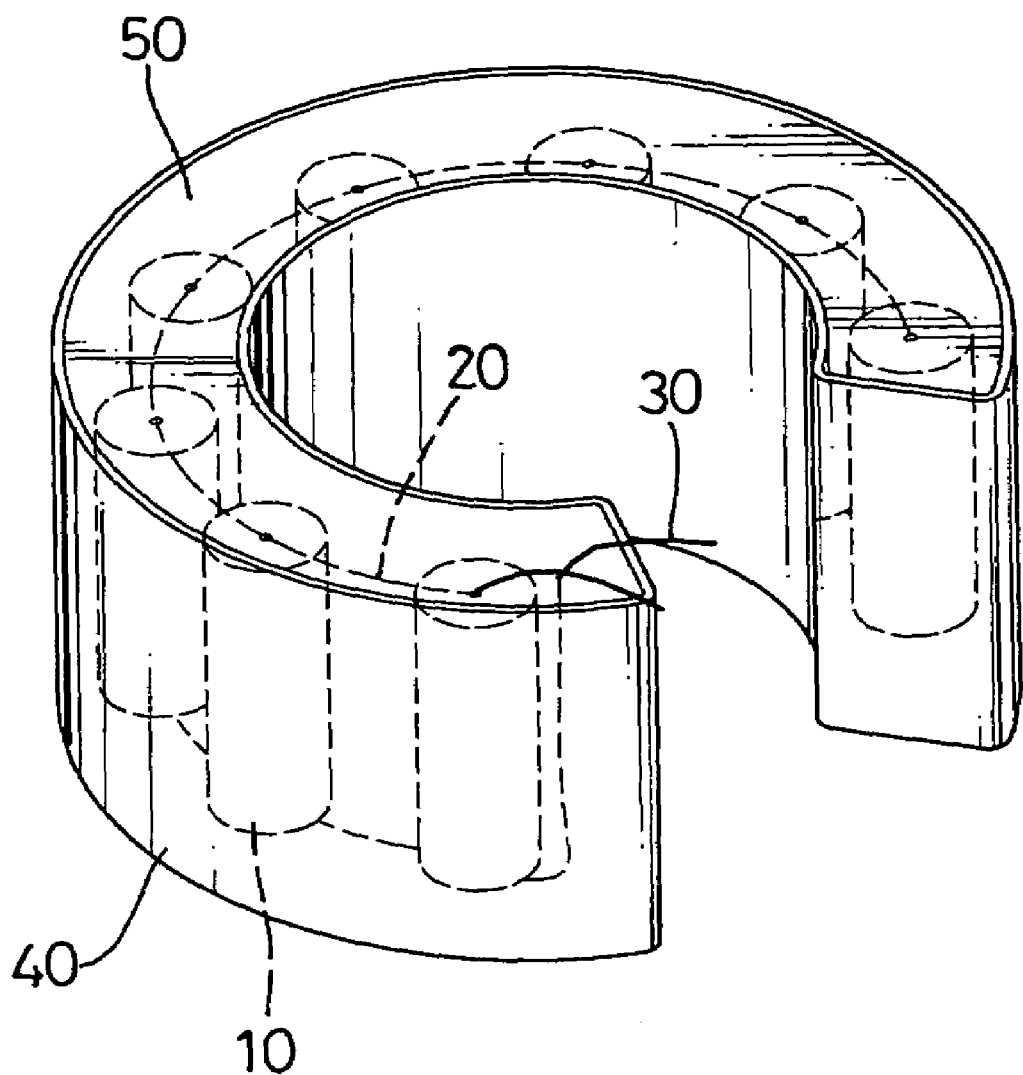
FIG. 1 is a perspective view of a C-shaped combination capacitor assembly in accordance with the present invention.

With reference to FIG. 1, a C-shaped combination capacitor assembly in accordance with the present invention comprises a C-shaped shell (40), multiple capacitors (10), two conducting wires (20), two lead wires (30) and encapsulant (50).

The C-shaped shell (40) is hollow and has an inner space and a top 8 opening.

Figure 2:
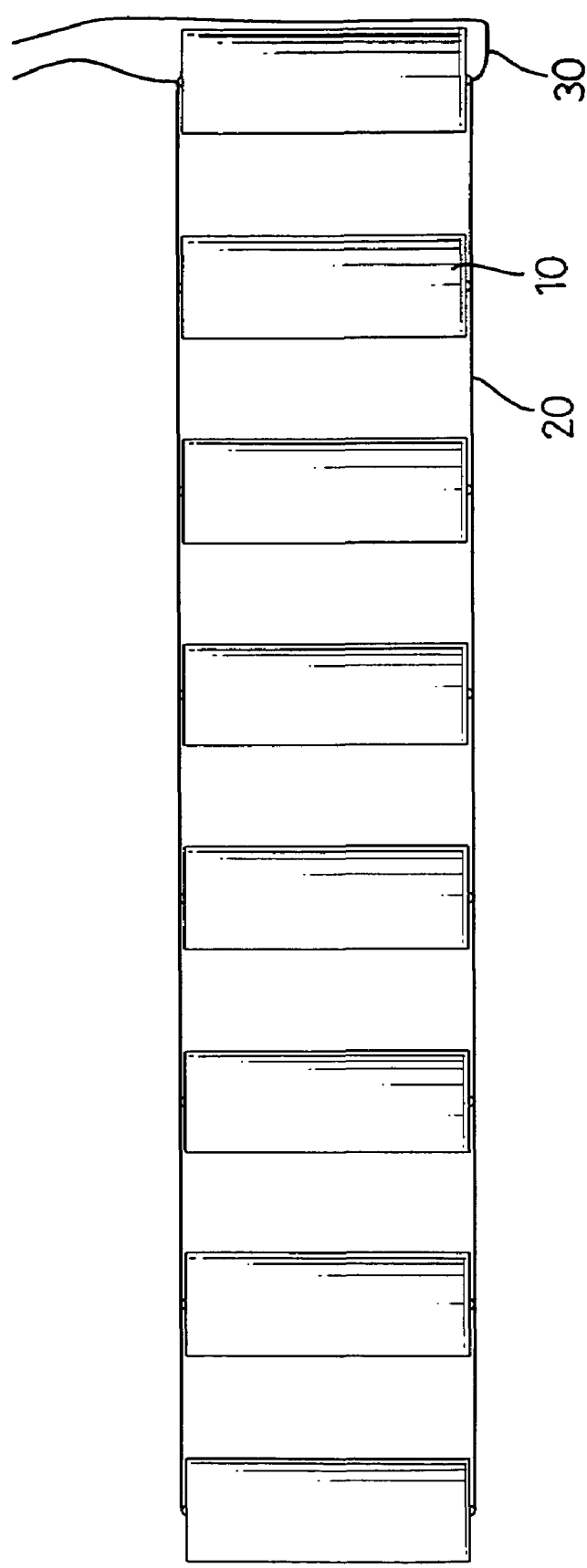
FIG. 2 is a side view of multiple capacitors connected in parallel in the C-shaped capacitor assembly in FIG. 1.
Figure 3:
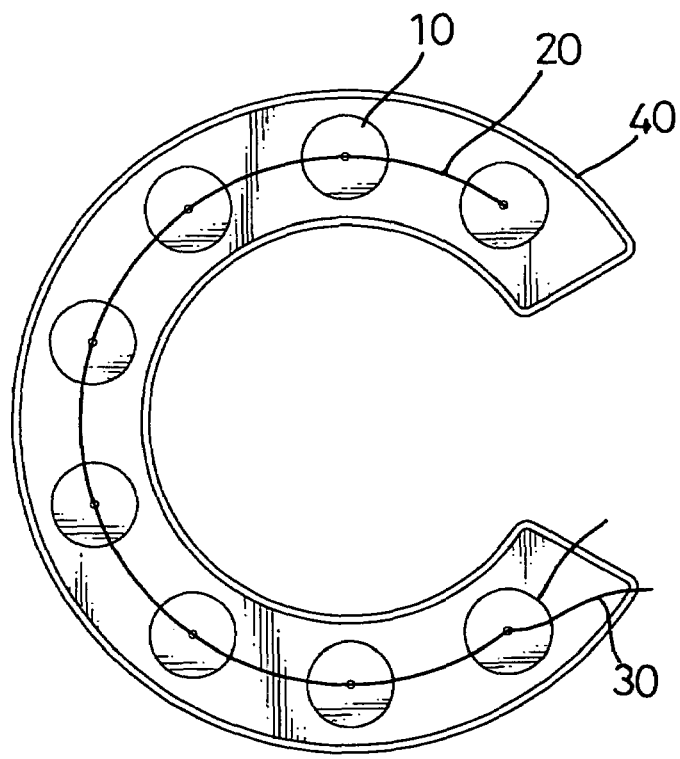
FIG. 3 is a top view of the multiple capacitors connected in parallel and a C-shaped shell of the C-shaped combination capacitor assembly in FIG. 1.
Figure 5:
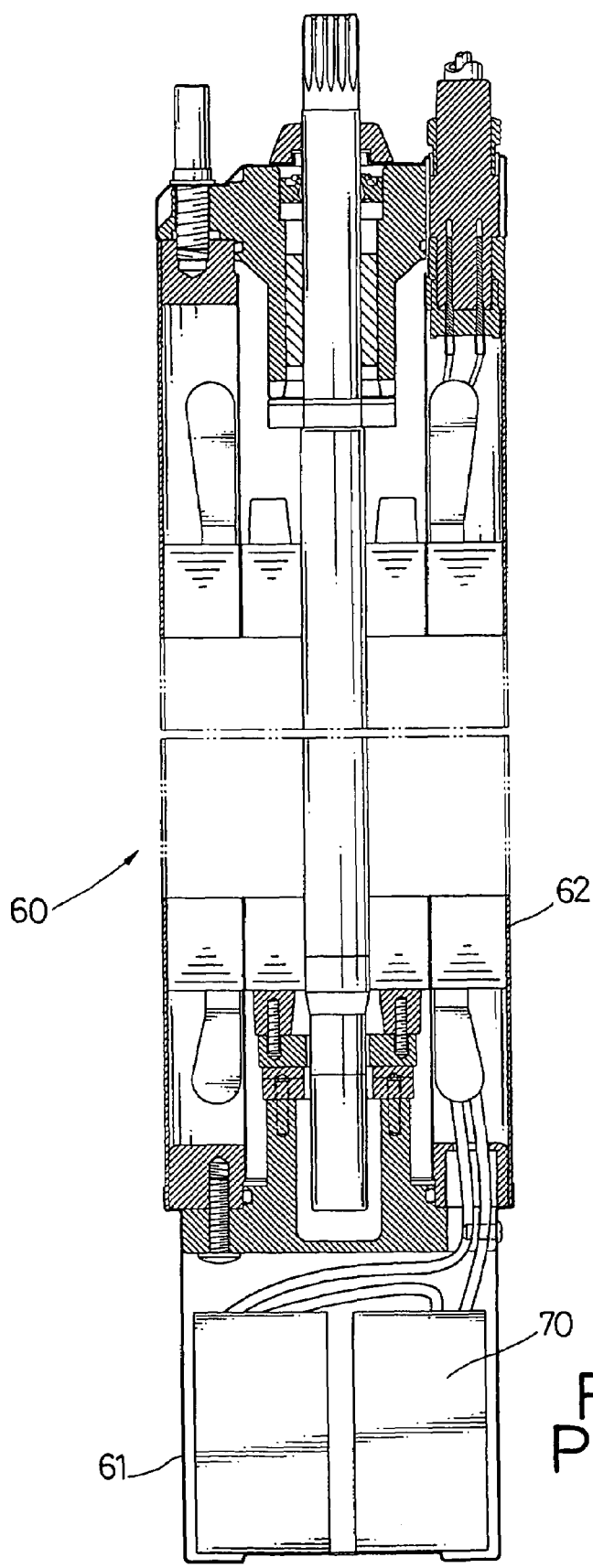
FIG. 5 is a side view in partial section of a conventional submersible motor in accordance with the prior art.
Figure 6:
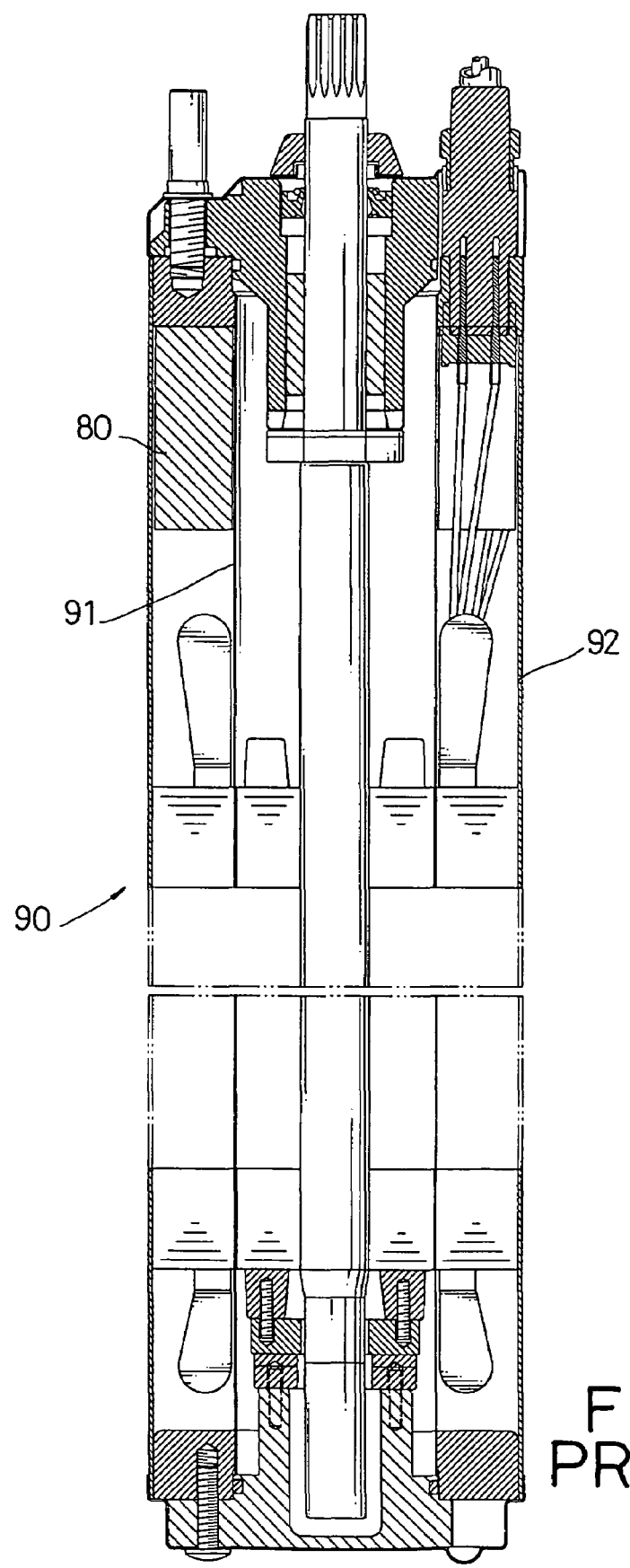
FIG. 6 is a side view in partial section of a conventional submersible motor with a C-shaped capacitor in accordance with the prior art.

With further reference to FIGS. 2 and 3, the capacitors (10) are mounted in the inner space of the C-shaped shell (40), and each capacitor (10) has a positive pole, a negative pole and a capacitance. One of the two conducting wires (20) connects to the positive poles of the capacitors (10), and the other conducting wire (20) connects to the negative poles of the capacitors (10) to connect the capacitors (10) in parallel. According to the formula to calculate the capacitance of capacitors connected in parallel: $C_{sum} = C_1 + C_2 + C_3 + \ldots + C_n$, connecting the capacitors (10) in parallel results in a capacitance equal to the sum of the capacitance of the individual capacitors (10).

One of the two lead wires (30) connects to one of the conducting wires (20) and protrudes from the top opening in the C-shaped shell (40). The other lead wire (30) connects to the other conducting wire (20) and protrudes from the top opening of the C-shaped shell (40).

Figure 4:
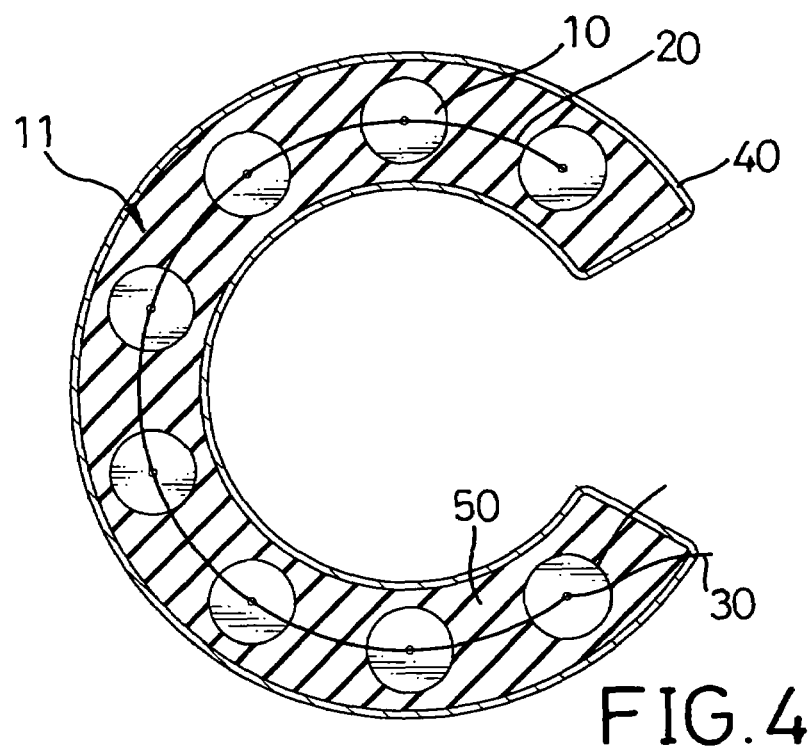
FIG. 4 is a top view in partial section of the C-shaped combination capacitor assembly in FIG. 1.

With further reference to FIG. 4, the encapsulant (50) fills the inner space of the C-shaped shell (40) and covers and seals the capacitors (10), the conducting wires (20) and the lead wires (30) inside the C-shaped shell (40).

Making a C-shaped combination capacitor assembly from multiple capacitors (10) connected in parallel connection is easy and can provide a large capacitance. No matter what size and capacitance a submersible motor needs, longer or shorter capacitors (10) and a C-shaped shell (40) can change the size and the capacitance of the C-shaped combination capacitor assembly.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A C-shaped combination capacitor assembly comprising
    a C-shaped shell being hollow and having an inner space and a top opening;
    multiple capacitors mounted in the inner space of the C-shaped shell, and each capacitor having
        a positive pole;
        a negative pole; and
        a capacitance;

two conducting wires connecting respectively to the positive and negative poles of the capacitors to connect the capacitors in parallel;

two lead wires connecting respectively to the conducting wires and protruding from the top opening of the C-shaped shell; and encapsulant filling the inner space of the C-shaped shell and covering and sealing the capacitors, the conducting wires and the lead wires inside the C-shaped shell.

* * * * *